Aug. 3, 1926.

A. N. PORTER 1,594,377

AUTOMOBILE WINDOW SCREEN

Filed Oct. 23, 1924    2 Sheets-Sheet 1

Inventor
Albert N. Porter

John P. Duffie
Attorney

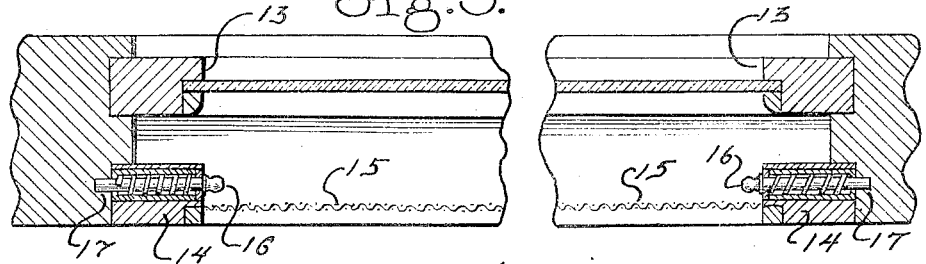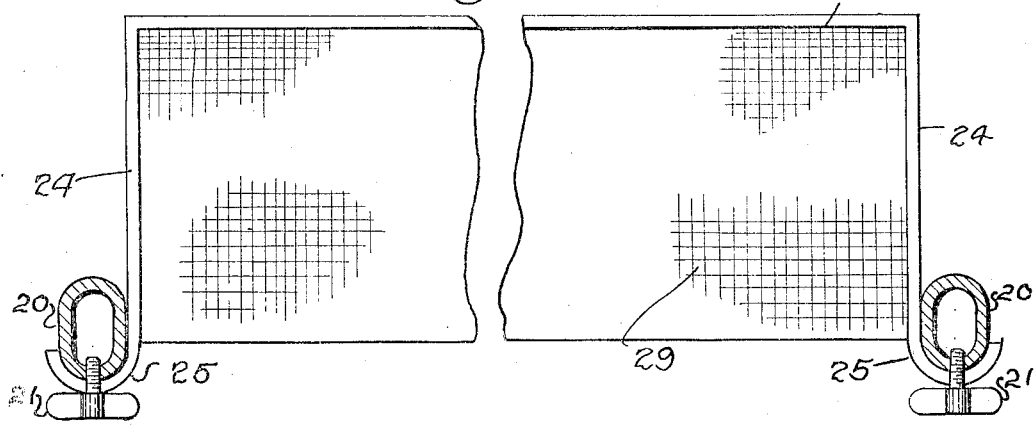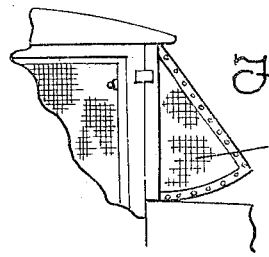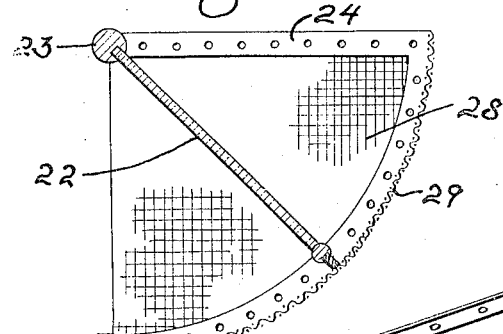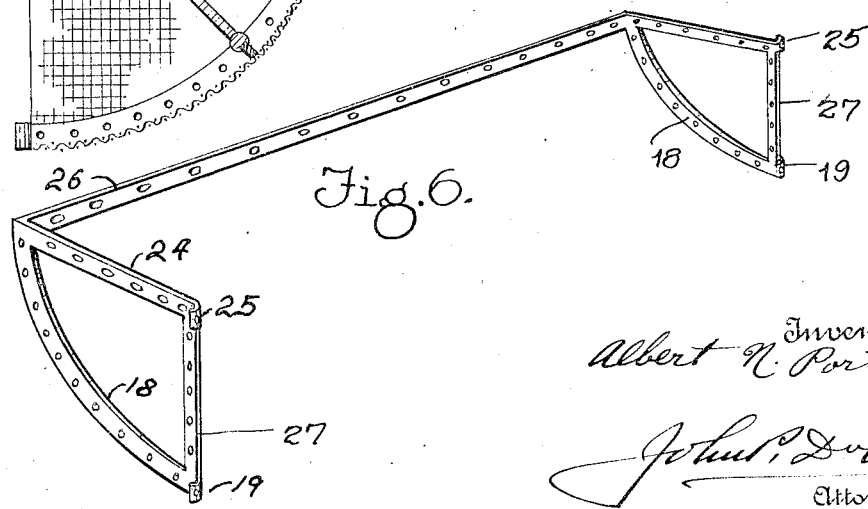

Patented Aug. 3, 1926.

1,594,377

UNITED STATES PATENT OFFICE.

ALBERT NATHEN PORTER, OF TULSA, OKLAHOMA, ASSIGNOR OF ONE-HALF TO EARL A. SHAW, OF TULSA, OKLAHOMA.

AUTOMOBILE WINDOW SCREEN.

Application filed October 23, 1924. Serial No. 745,424.

This invention relates to automobiles and has special reference to automobile window screens.

It is a well understood fact that the occupants of automobiles are subject to much annoyance from insects even in the closed body type of such vehicles since it is necessary, especially in summer time, to have the windows open for ventilation. Moreover, with the windshield open, insects frequently blow in and strike the operator in the face, sometimes blinding him so that he loses control of the machine with the result that the machine and occupants are injured, deaths having happened from this cause.

Again, with the windows unscreened, articles of clothing and valuable papers have been blown out of the vehicle to the great loss and inconvenience of the occupants or owners of the articles. One important object of the present invention is to provide an automobile body of the closed type with suitable reticulated screens managed for ready and concenient attachment and detachment from position to close the respective openings.

A second important object of the invention is to provide an improved form of detachable reticulated screening device for the windshield of an automobile wherein the windshield may be opened to any desired extent with the spaces opened by the opening of the shield at all times properly screened.

With the above and other objects in view, the invention consists in general of certain novel details of construction and combinations of parts hereinafter fully described, illustrated in the drawings and specifically claimed.

In the accompanying drawings like characters of reference indicate like parts in the several views, and:—

Figure 3 is an enlarged detail section on the line 3—3 of Figure 1.

Figure 4 is an enlarged detail section of the windshield arrangement, the view being taken on the line 4—4 of Figure 2.

Figure 5 is a vertical section, taken on line 2—2 of Figure 2.

Figure 6 is a perspective view of the frame used for the wind-shield screen.

Figure 7 is a view showing a modified form of wind shield screen.

Figure 1:
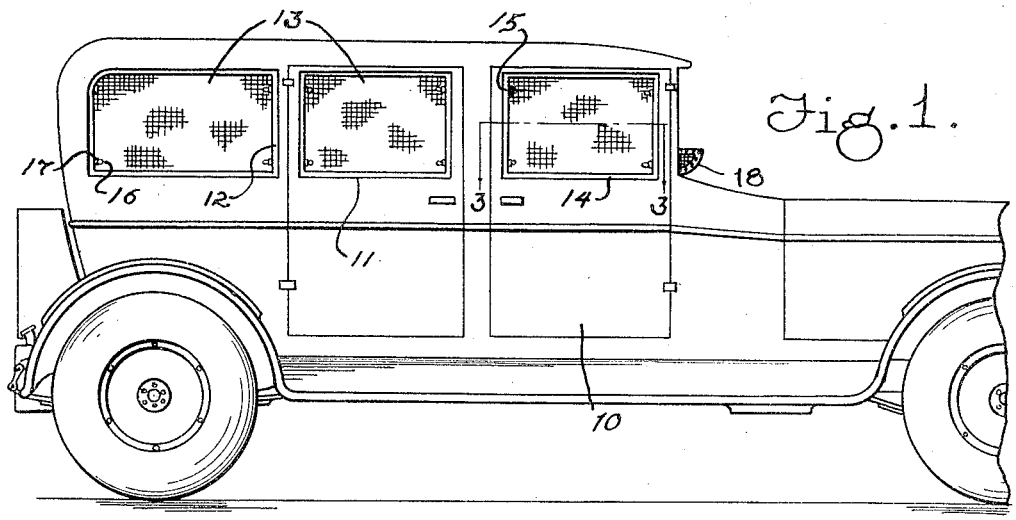
Figure 1 is a side elevation of an automobile provided with screens in accordance with this invention.
Figure 2:
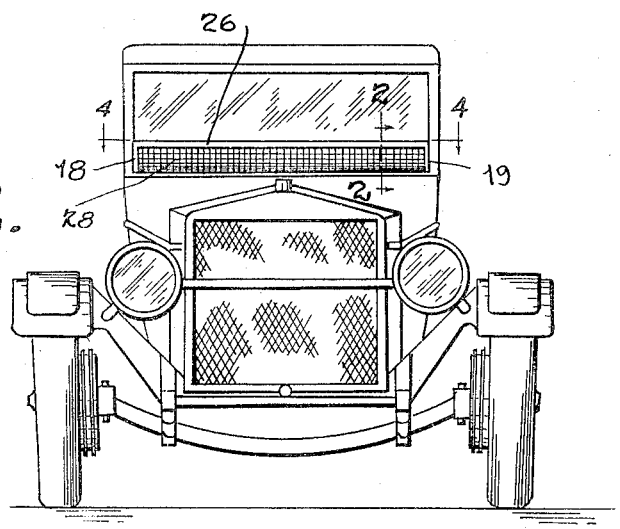
Figure 2 is a front view thereof.

In the embodiments of the invention illustrated in the accompanying drawings, certain preferred forms are shown which are to be understood as typical of a variety of constructions in which the invention may be embodied. In these forms the screens have been shown as applied to an automobile having a body 10 provided with window openings 11 in its sides, these openings having upright side frames 12. In these openings are provided the usual windows 13 and the outer parts of the frames may be rabbeted, although this may be avoided in existing cars. In any case, the window frames have fitted therein the screen frames 14 which are provided with the usual wire fly screening 15 and which are secured in place by small bolts 16 entering sockets 17 in the window frame sides. As here shown these bolts are of the ordinary spring bolt type but other types of fastenings such as set screws may be employed as will be obvious to those skilled in the art.

Now such screening, while effectual and satisfactory for sliding windows, is not suitable for wind shields since the latter are, almost invariably, of the swinging type. To properly protect a windshield a different screen arrangement must be used and, to this end, there is provided a frame having lower arcuate members 18 provided at their inner ends with hooks 19 arranged to engage partially around the uprights 20 of the wind shield frame and to be secured thereto by thumb screws 21. These thumb screws connect the members 18 and 20 opposite the free swinging edge of the windshield 22 and the members are curved concentrically to the pivoted frame member 23 of such windshield. From the outer ends of the members 18 extend the straight upper members 24 which terminate in alignment with the axis of the windshield frame member 23 and are there provided with hooks 25, secured to the uprights 20 by thumb screws 21 as before. Thus the uprights 20 and members 18 and 24 form a pair of parallel sectoral frames and these frames are united at their outer ends by a cross tie 26. The inner ends or hooks of the members 18 and 24 are connected by uprights 27 and to these uprights and said members are connected screen sectors 28 while an arcuate screen 29 is secured to the outer edges of the arcuate members 18 so that a screened cylindrical sector of the same radius as the windshield is thus formed, the free edge of the windshield sweeping over the screen 29. Thus, the windshield, when open, is screened in at both sides and bottom.

There has thus been provided a simple and efficient device of the kind described and for the purpose specified.

While my invention has been shown in connection with an automobile of the closed body type, this is merely for the purpose of illustration and it is to be understood that the same may be used in connection with any type of steam, electric or gas car. For example, when used in connection with an automobile of the open body type, the screens may be suitably fitted in or attached to the curtains. It will also be apparent that a fully screened automobile is a great protection against hold-ups on the road by virtue of the fact that it is impossible under such conditions for a road agent to jump on the running board and lean through the window.

Having thus described the invention, what is claimed as new, is:

The combination with a windshield frame and a windshield pivoted thereto; of a pair of sectoral screen frames having each a side concentric with the pivotal axis of the shield and attached at one end to the frame at the free edge of said shield, a side extending from the outer end of the first side, and a side coincident with the shield frame side, said sectoral frames being parallel and connected at their outer ends by a tie bar, screen sectors fitting the sectoral frames, and an arcuate screen supported by the arcuate sides of the sectoral frame and said tie bar.

In testimony whereof he affixes his signature.

ALBERT NATHEN PORTER.